United States Patent
Landis et al.

(10) Patent No.: US 12,512,911 B2
(45) Date of Patent: Dec. 30, 2025

(54) COMMUNICATION VIA A REFLECTOR

(71) Applicant: QUALCOMM Incorporated, San Diego, CA (US)

(72) Inventors: Shay Landis, Hod Hasharon (IL); Yehonatan Dallal, Kfar Saba (IL); Amit Bar-Or Tillinger, Tel-Aviv (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 18/069,064

(22) Filed: Dec. 20, 2022

(65) Prior Publication Data
US 2024/0204871 A1    Jun. 20, 2024

(51) Int. Cl.
*H04B 10/112* (2013.01)
*H04B 7/155* (2006.01)
*H04W 72/044* (2023.01)
*H04W 72/0446* (2023.01)

(52) U.S. Cl.
CPC ......... *H04B 10/1129* (2013.01); *H04B 7/155* (2013.01); *H04W 72/0446* (2013.01); *H04W 72/046* (2013.01)

(58) Field of Classification Search
CPC .. H04B 10/1129; H04B 7/155; H04B 10/118; H04B 10/1143; H04B 10/116; H04B 10/1149; H04B 10/114; H04W 72/0446; H04W 72/046; H04W 7/40833
See application file for complete search history.

(56) References Cited

U.S. PATENT DOCUMENTS

| 11,570,784 | B2 * | 1/2023 | Kim | H04L 5/0048 |
| 2007/0127928 | A1 * | 6/2007 | Varshneya | H04B 10/2587 |
| | | | | 398/135 |
| 2021/0315015 | A1 * | 10/2021 | Noh | H04L 5/001 |
| 2022/0256519 | A1 * | 8/2022 | Jeon | G01S 7/0235 |
| 2023/0090914 | A1 * | 3/2023 | Cha | H04W 24/10 |
| | | | | 370/329 |
| 2023/0113535 | A1 * | 4/2023 | Zhou | G01S 7/484 |
| | | | | 356/4.01 |

* cited by examiner

*Primary Examiner* — Hibret A Woldekidan
(74) *Attorney, Agent, or Firm* — Harrity & Harrity LLP

(57) ABSTRACT

Various aspects of the present disclosure generally relate to wireless communication. In some aspects, a user equipment (UE) may receive a signal from a network node. The UE may reflect, toward the network node, the signal with a modulation that indicates an identification of the UE. Numerous other aspects are described.

30 Claims, 11 Drawing Sheets

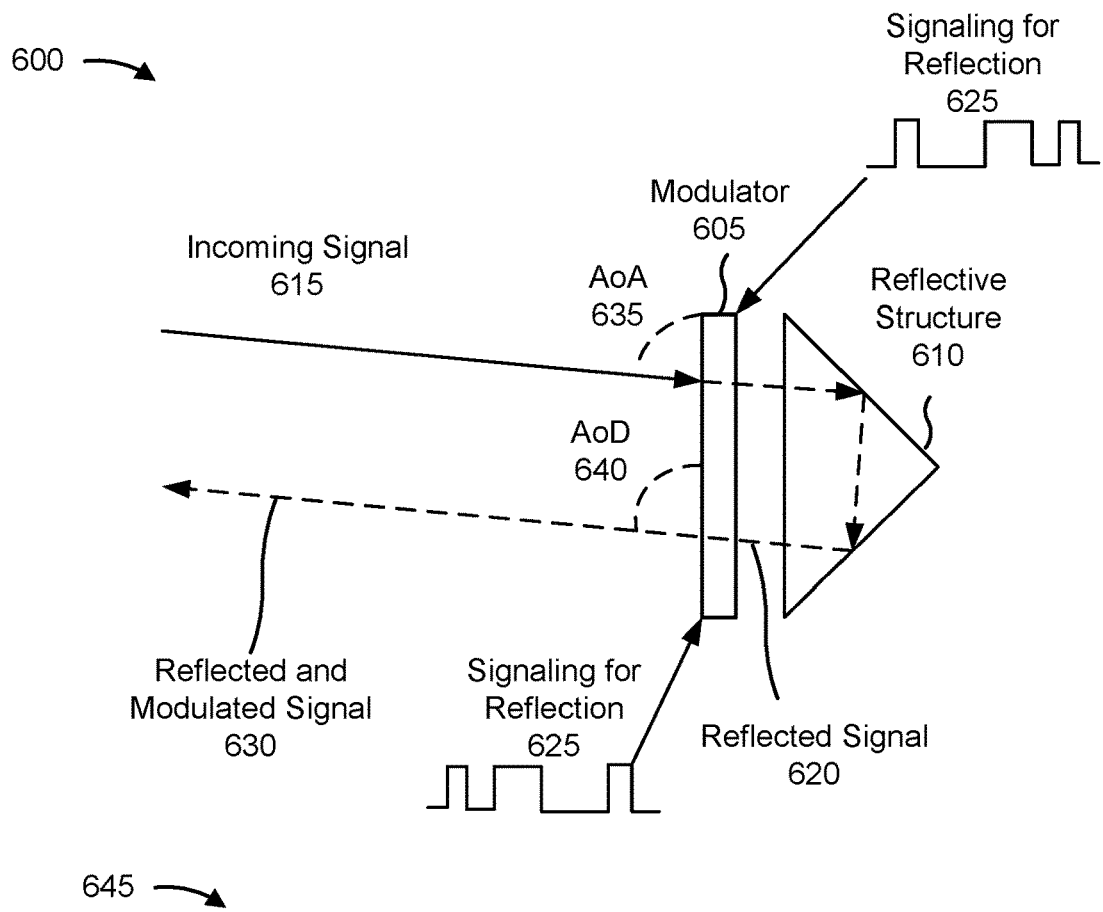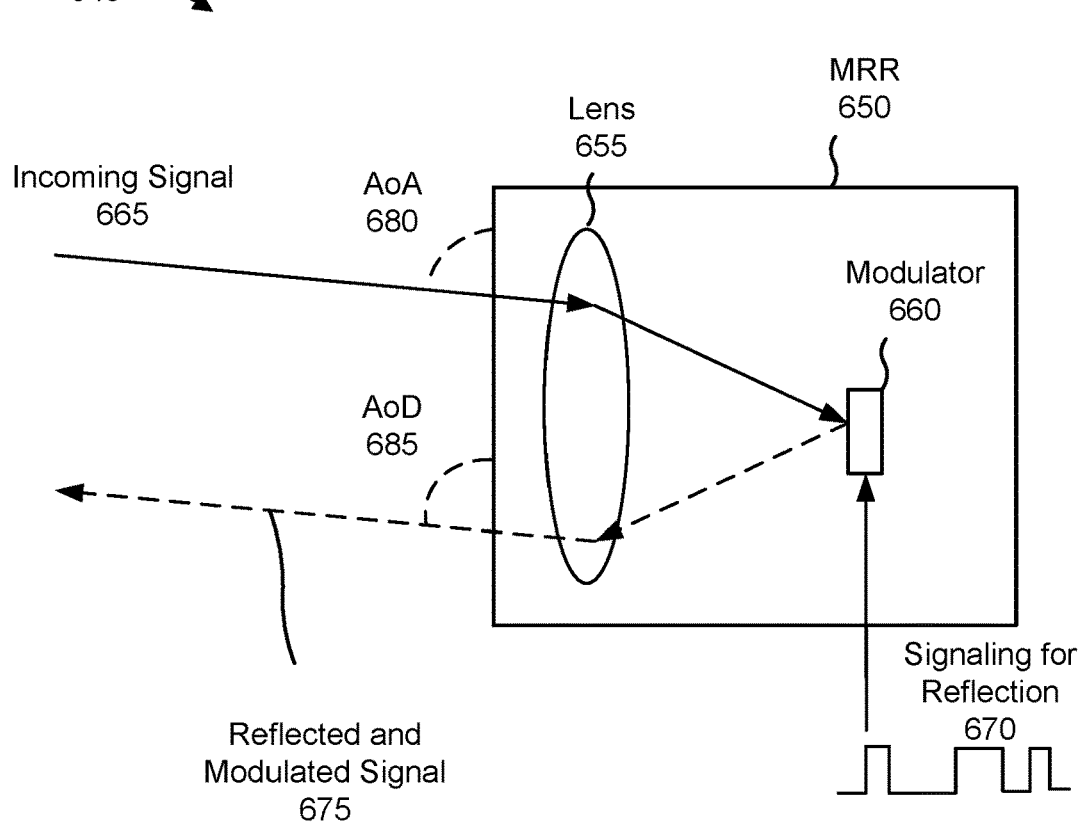
FIG. 6

COMMUNICATION VIA A REFLECTOR

FIELD OF THE DISCLOSURE

Aspects of the present disclosure generally relate to wireless communication and to techniques and apparatuses for communication via a reflector.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating examples of MRR architectures, in accordance with the present disclosure.

SUMMARY

Figure 1:
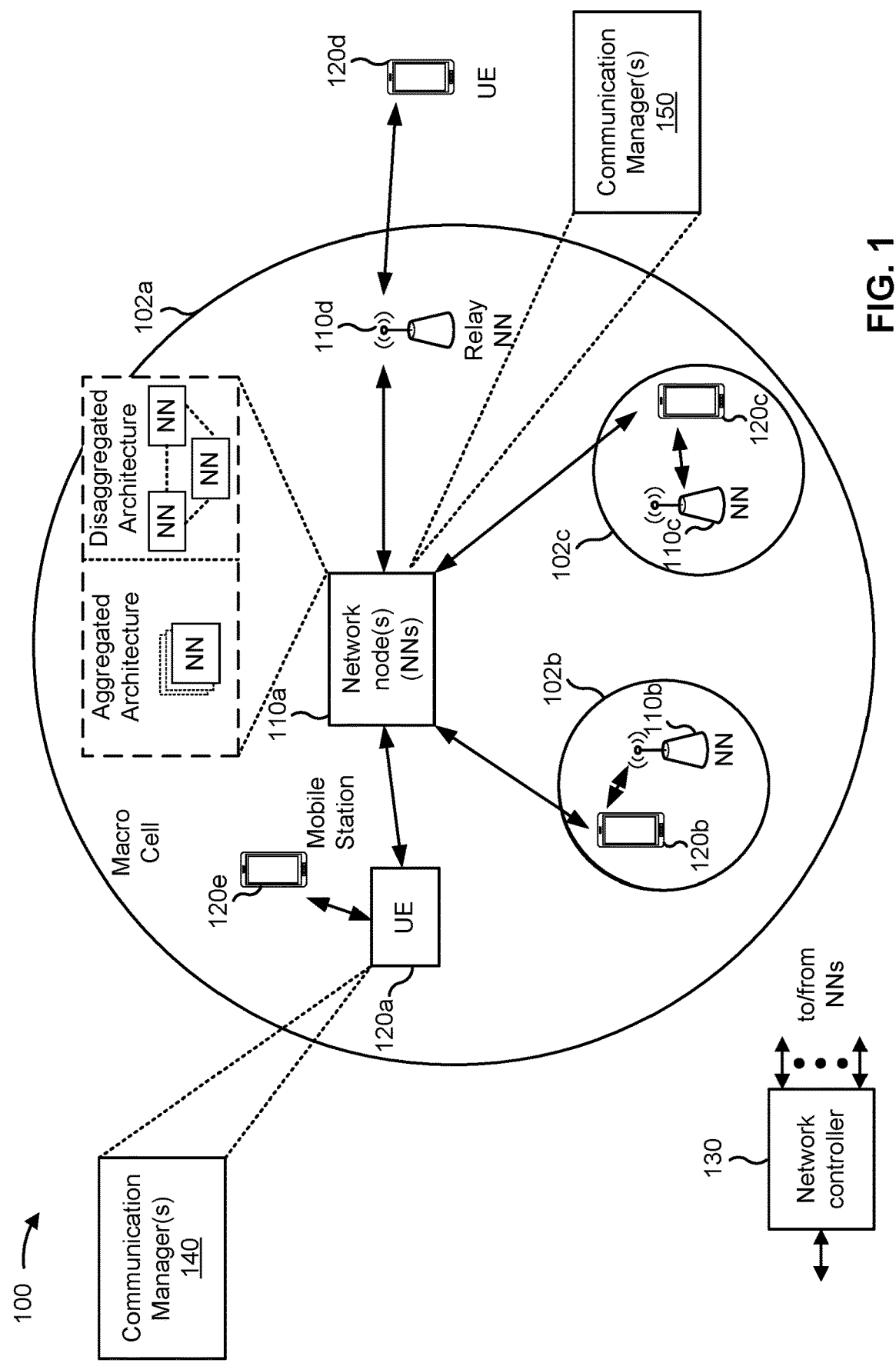
FIG. 1 is a diagram illustrating an example of a wireless network, in accordance with the present disclosure.

Some aspects described herein relate to a method of wireless communication performed by a user equipment (UE). The method may include receiving a signal from a network node. The method may include reflecting, toward the network node, the signal with a modulation that indicates an identification of the UE.

Some aspects described herein relate to a method of wireless communication performed by a network node. The method may include transmitting a signal. The method may include receiving, from a UE, a reflection of the signal with a modulation that indicates an identification of the UE.

Some aspects described herein relate to a UE for wireless communication. The UE may include a memory and one or more processors coupled to the memory. The one or more processors may be configured to receive a signal from a network node. The one or more processors may be configured to reflect, toward the network node, the signal with a modulation that indicates an identification of the UE.

Some aspects described herein relate to a network node for wireless communication. The network node may include a memory and one or more processors coupled to the memory. The one or more processors may be configured to transmit a signal. The one or more processors may be configured to receive, from a UE, a reflection of the signal with a modulation that indicates an identification of the UE.

Some aspects described herein relate to a non-transitory computer-readable medium that stores a set of instructions for wireless communication by a UE. The set of instructions, when executed by one or more processors of the UE, may cause the UE to receive a signal from a network node. The set of instructions, when executed by one or more processors of the UE, may cause the UE to reflect, toward the network node, the signal with a modulation that indicates an identification of the UE.

Some aspects described herein relate to a non-transitory computer-readable medium that stores a set of instructions for wireless communication by a network node. The set of instructions, when executed by one or more processors of the network node, may cause the network node to transmit a signal. The set of instructions, when executed by one or more processors of the network node, may cause the network node to receive, from a UE, a reflection of the signal with a modulation that indicates an identification of the UE.

Some aspects described herein relate to an apparatus for wireless communication. The apparatus may include means for receiving a signal from a network node. The apparatus may include means for reflecting, toward the network node, the signal with a modulation that indicates an identification of the apparatus.

Some aspects described herein relate to an apparatus for wireless communication. The apparatus may include means for transmitting a signal. The apparatus may include means for receiving, from a UE, a reflection of the signal with a modulation that indicates an identification of the UE.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a signal from a network node; and reflect, toward the network node, the signal with a modulation that indicates an identification of the UE. Additionally, or alternatively, the communication manager 140 may perform one or more other operations described herein.

In some aspects, the network node 110 may include a communication manager 150. As described in more detail elsewhere herein, the communication manager 150 may transmit a signal; and receive, from a UE, a reflection of the signal with a modulation that indicates an identification of the UE. Additionally, or alternatively, the communication manager 150 may perform one or more other operations described herein.

As indicated above, FIG. 1 is provided as an example. Other examples may differ from what is described with regard to FIG. 1.

Figure 2:
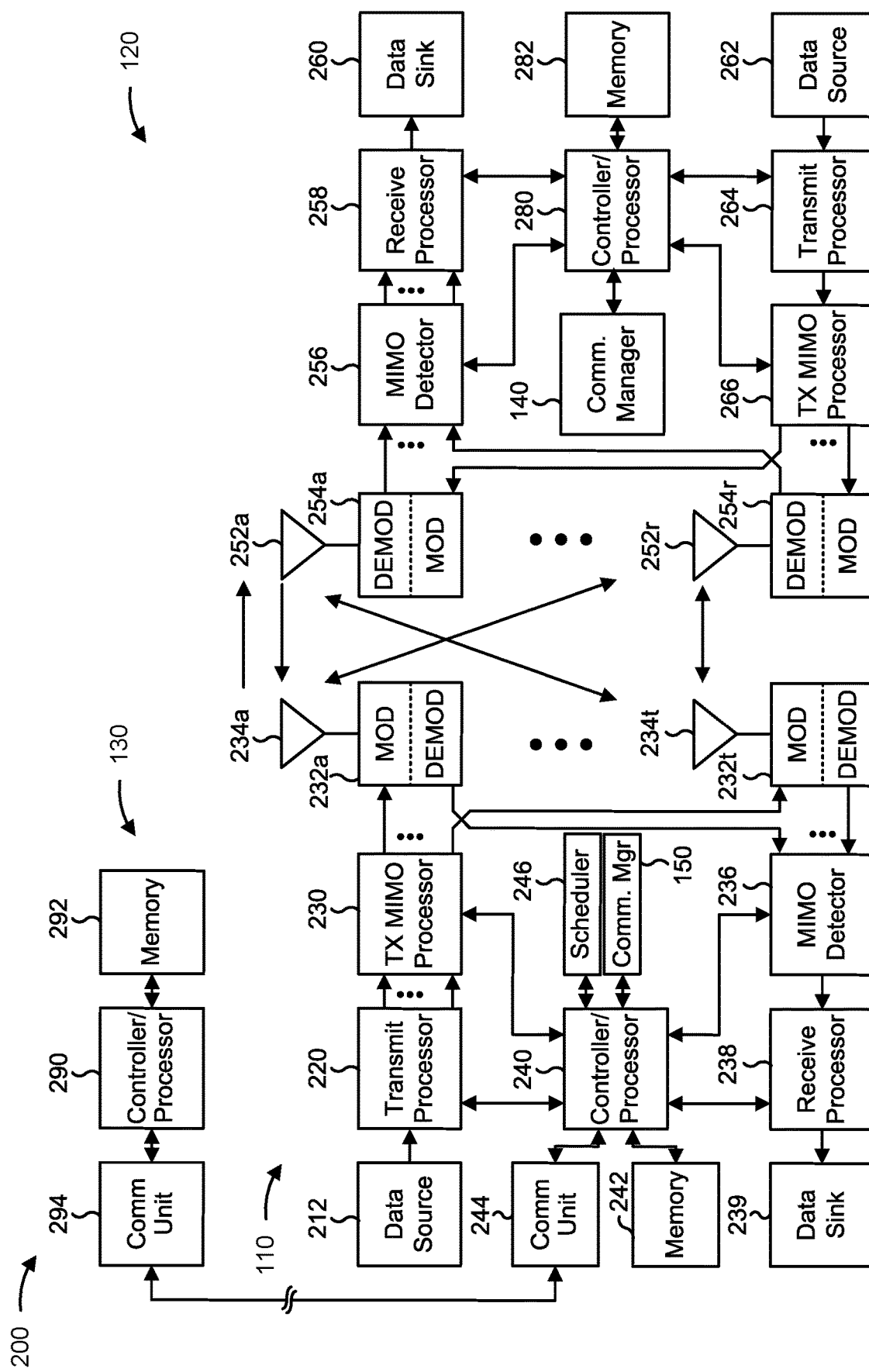
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the network node 110, the controller/processor 280 of the UE 120, and/or any other component(s) of FIG. 2 may perform one or more techniques associated with communication via a reflector, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a signal from a network node; and/or means for reflecting, toward the network node, the signal with a modulation that indicates an identification of the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a signal; and/or means for receiving, from a UE, a reflection of the signal with a modulation that indicates an identification of the UE. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
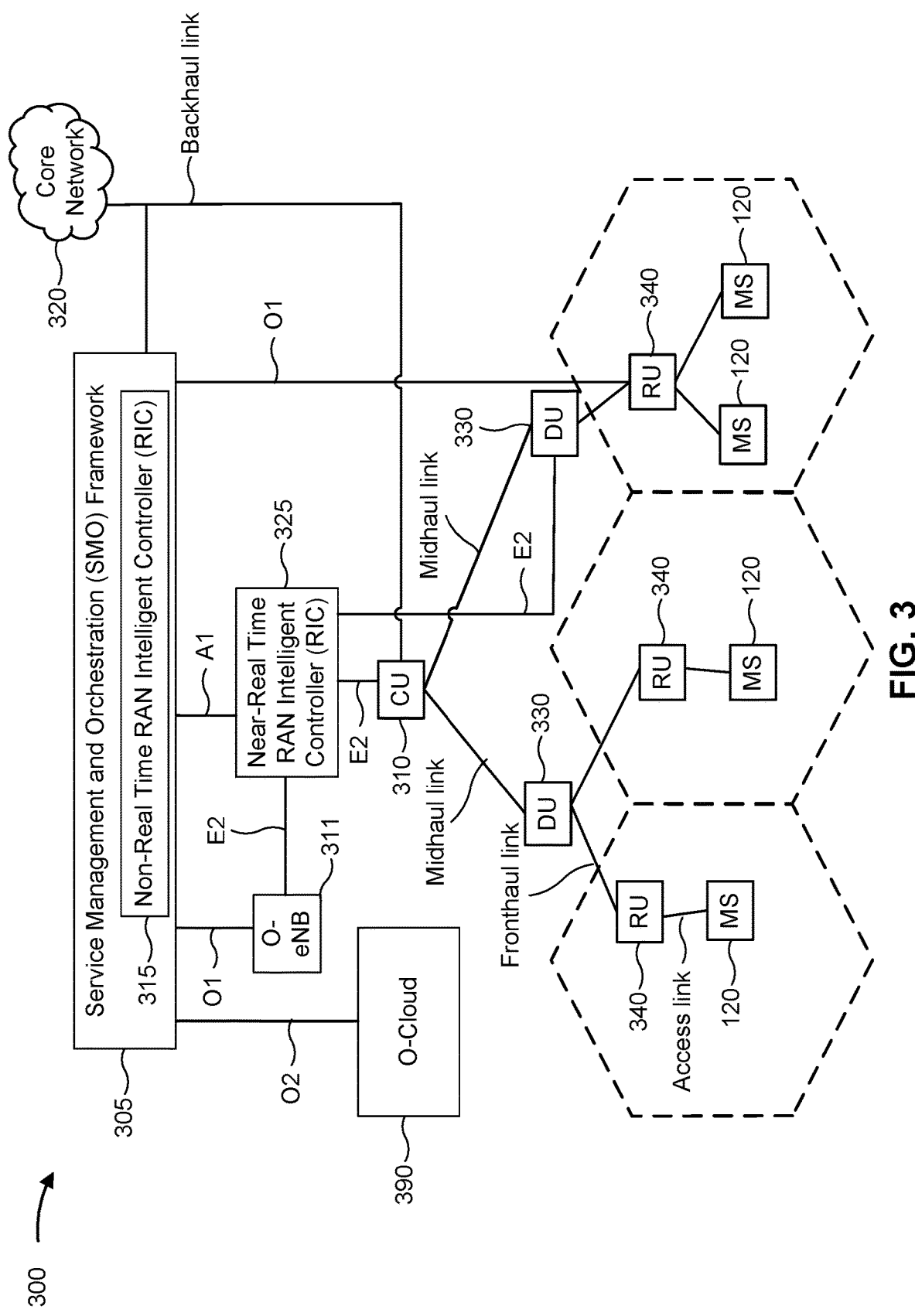
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
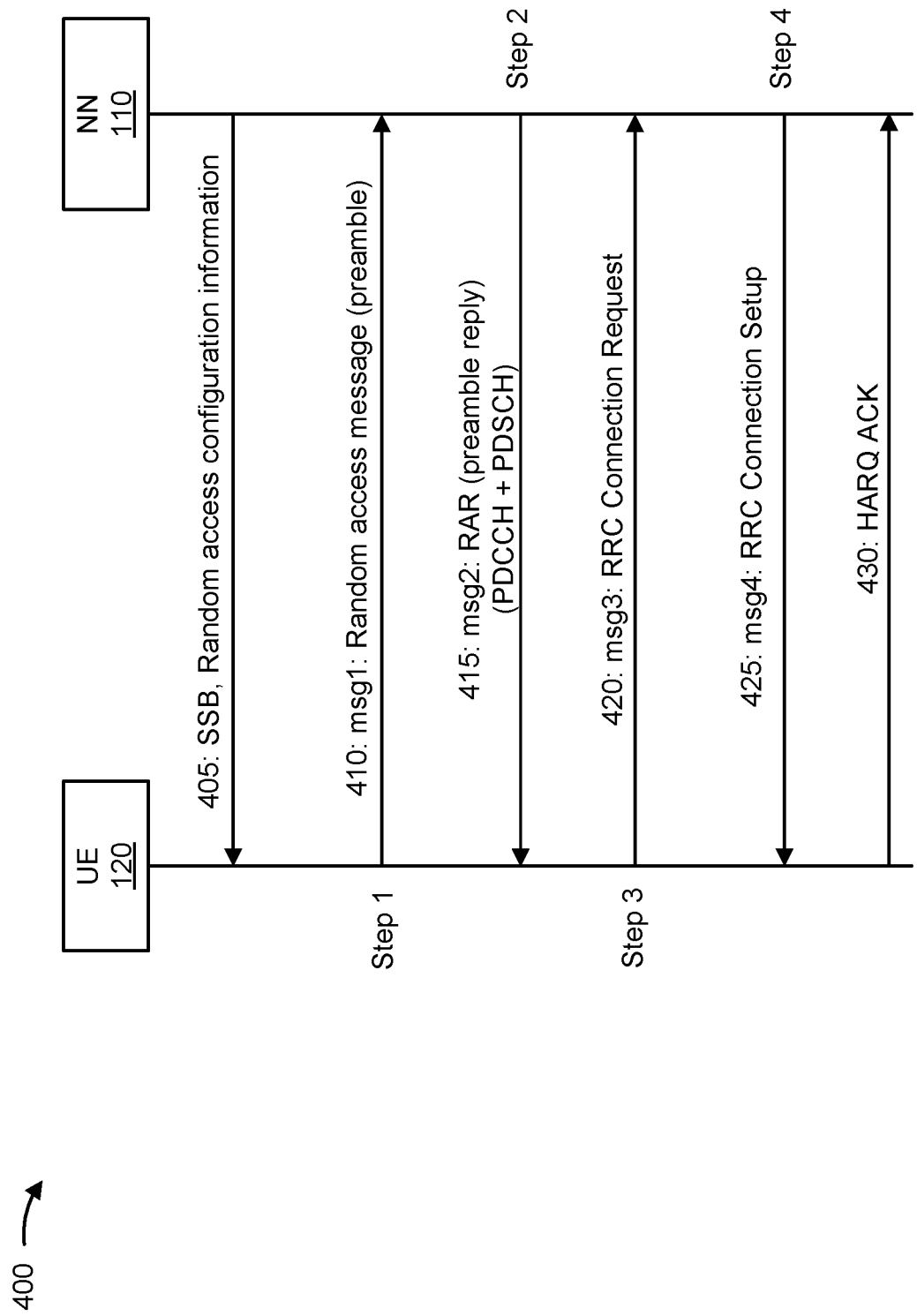
FIG. 4 is a diagram illustrating an example of a four-step random access procedure, in accordance with the present disclosure.

FIG. 4 is a diagram illustrating an example of a four-step random access procedure, in accordance with the present disclosure. As shown in FIG. 4, a network node 110 and a UE 120 may communicate with one another to perform the four-step random access procedure.

As shown by reference number 405, the network node 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in an RRC message and/or a physical downlink control channel (PDCCH) order message that triggers a random access channel (RACH) procedure, such as for contention-free random access. The random access configuration information may include one or more parameters to be used in the random access procedure, such as one or more parameters for transmitting a random access message (RAM) and/or one or more parameters for receiving a random access response (RAR).

As shown by reference number 410, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The RAM may include a random access preamble identifier.

As shown by reference number 415, the network node 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the network node 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also as part of the second step of the four-step random access procedure, the network node 110 may transmit the PDSCH communication for the RAR, as scheduled by the PDCCH communication. The RAR may be included in a MAC protocol data unit (PDU) of the PDSCH communication.

As shown by reference number 420, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 425, the network node 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 430, if the UE 120 successfully receives the RRC connection setup message, the UE 120 may transmit a hybrid automatic repeat request (HARQ) acknowledgment (ACK).

In RF-based communications, the 4-step RACH process of FIG. 4 may be used by a UE to gain access to a network. Alternatively, some networks may use a 2-step RACH process. In either RACH process, the UE and the network node generate and transmit messages associated with the RACH process. However, if the UE uses optical wireless communications (OWCs), the UE may generate and transmit one or more of the messages using an RF transmitter (e.g., an RF transmission chain with one or more RF antennas) or a laser. However, generating and transmitting the one or more messages consumes power resources of the UE. Alternatively, the UE may be configured with a modulated retro reflector (MRR) that is configured to reflect signals, but not generate a new signal. However, the UE may be unable to use the MRR to transmit one or more messages described in connection with FIG. 4.

As indicated above, FIG. 4 is provided as an example. Other examples may differ from what is described with regard to FIG. 4.

Figure 5:
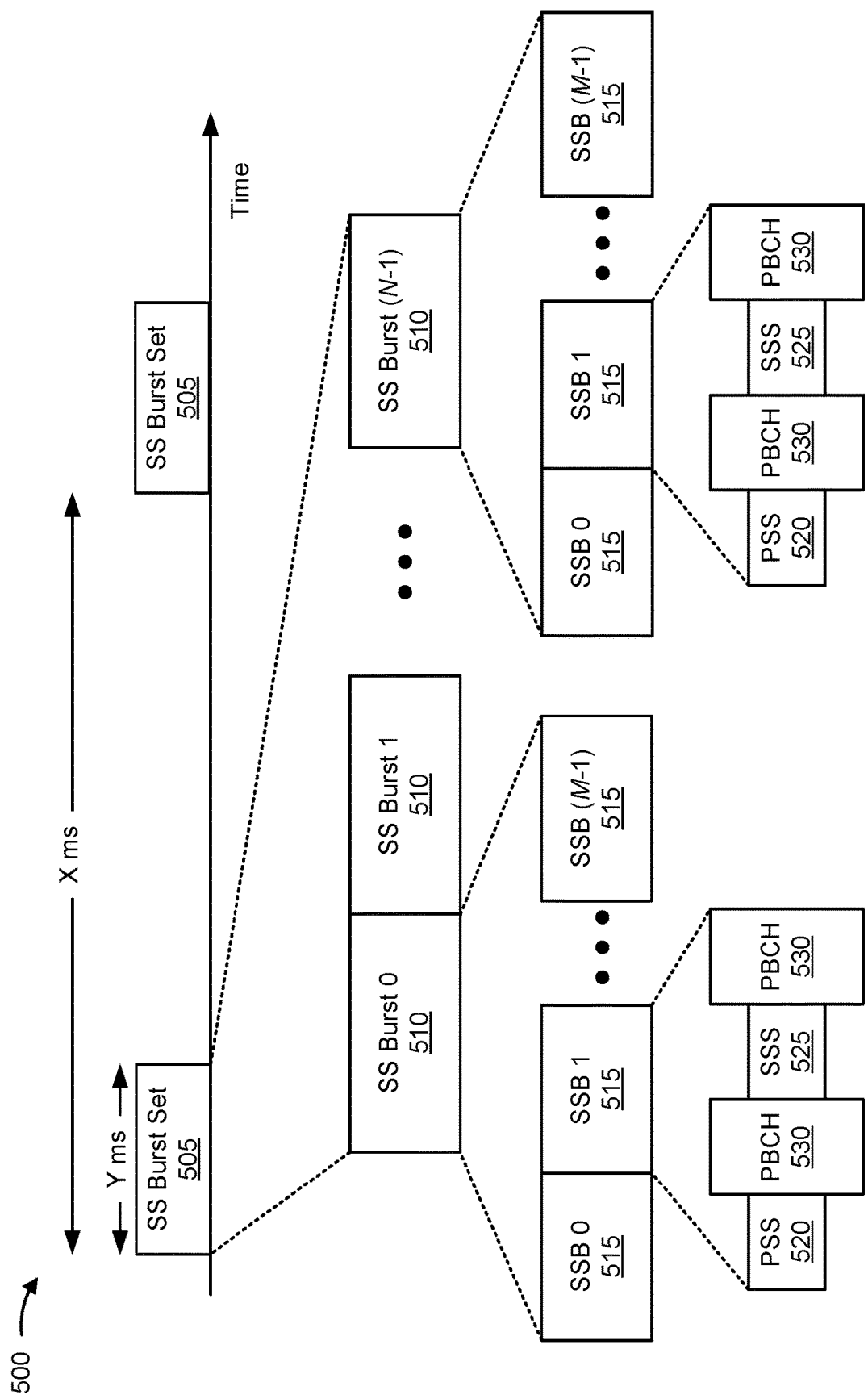
FIG. 5 is a diagram illustrating an example of a synchronization signal (SS) hierarchy, in accordance with the present disclosure.

FIG. 5 is a diagram illustrating an example 500 of a synchronization signal (SS) hierarchy, in accordance with the present disclosure. As shown in FIG. 5, the SS hierarchy may include an SS burst set 505, which may include multiple SS bursts 510, shown as SS burst 0 through SS burst N−1, where N is a maximum number of repetitions of the SS burst 510 that may be transmitted by one or more network nodes. As further shown, each SS burst 510 may include one or more SSBs 515, shown as SSB 0 through SSB M−1, where M is a maximum number of SSBs 515 that can be carried by an SS burst 510. In some aspects, different SSBs 515 may be beam-formed differently (e.g., transmitted using different beams), and may be used for cell search, cell acquisition, beam management, and/or beam selection (e.g., as part of an initial network access procedure). An SS burst set 505 may be periodically transmitted by a wireless node (e.g., a network node 110), such as every X milliseconds, as shown in FIG. 5. In some aspects, an SS burst set 505 may have a fixed or dynamic length, shown as Y milliseconds in FIG. 5. In some cases, an SS burst set 505 or an SS burst 510 may be referred to as a discovery reference signal (DRS) transmission window or an SSB measurement time configuration (SMTC) window.

In some examples, an SSB 515 may include resources that carry a PSS 520, an SSS 525, and/or a physical broadcast channel (PBCH) 530. In some aspects, multiple SSBs 515 are included in an SS burst 510 (e.g., with transmission on different beams), and the PSS 520, the SSS 525, and/or the PBCH 530 may be the same across each SSB 515 of the SS burst 510. In some aspects, a single SSB 515 may be included in an SS burst 510. In some aspects, the SSB 515 may be at least four symbols (e.g., OFDM symbols) in length, where each symbol carries one or more of the PSS 520 (e.g., occupying one symbol), the SSS 525 (e.g., occupying one symbol), and/or the PBCH 530 (e.g., occupying two symbols). In some aspects, an SSB 515 may be referred to as an SS/PBCH block.

In some examples, the symbols of an SSB 515 are consecutive, as shown in FIG. 5. In some aspects, the symbols of an SSB 515 are non-consecutive. Similarly, in some aspects, one or more SSBs 515 of the SS burst 510 may be transmitted in consecutive radio resources (e.g., consecutive symbols) during one or more slots. Additionally, or alternatively, one or more SSBs 515 of the SS burst 510 may be transmitted in non-consecutive radio resources.

In some examples, the SS bursts 510 may have a burst period, and the SSBs 515 of the SS burst 510 may be transmitted by a wireless node (e.g., a network node 110) according to the burst period. In this case, the SSBs 515 may be repeated during each SS burst 510. In some aspects, the SS burst set 505 may have a burst set periodicity, whereby the SS bursts 510 of the SS burst set 505 are transmitted by the wireless node according to the fixed burst set periodicity. In other words, the SS bursts 510 may be repeated during each SS burst set 505.

In some examples, an SSB 515 may include an SSB index, which may correspond to a beam used to carry the SSB 515. A UE 120 may monitor for and/or measure SSBs 515 using different receive (Rx) beams during an initial network access procedure and/or a cell search procedure, among other examples. Based at least in part on the monitoring and/or measuring, the UE 120 may indicate one or more SSBs 515 with a best signal parameter (e.g., an RSRP parameter) to a network node 110 (e.g., directly or via one or more other network nodes). The network node 110 and the UE 120 may use the one or more indicated SSBs 515 to select one or more beams to be used for communication between the network node 110 and the UE 120 (e.g., for an RACH procedure). Additionally, or alternatively, the UE 120 may use the SSB 515 and/or the SSB index to determine a cell timing for a cell via which the SSB 515 is received (e.g., a serving cell).

In some examples, the network node 110 may transmit the SSB via multiple beams such that UEs associated with different beams may receive the SSB. For example, the network node may use time-division duplexing (TDD) to transmit the SSB on the multiple beams (e.g., beam sweeping). The UE may use information within the SSB to identify a resource for transmission of a RACH message (e.g., msg1 described in connection with FIG. 4).

As indicated above, FIG. 5 is provided as an example. Other examples may differ from what is described with regard to FIG. 5.

FIG. 6 is a diagram illustrating examples 600 and 650 of MRR architectures, in accordance with the present disclosure. The MRR architectures may be used by a first wireless communication device to provide a modulated signal (e.g., carrying data and/or control signaling) to a second wireless communication device. In MRR-based communications, the second wireless communication device (e.g., a network node) may provide a signal to the first wireless communication device (e.g., a UE), and the first wireless communication device may reflect the signal back to the second wireless communication device. In some examples, the first wireless communication device may modulate the signal before reflecting the signal to the second wireless communication device.

In some examples, the signal may be an electromagnetic field (EMF)-based signal, such as a laser-based signal. The signal may be referred to as a laser signal herein, which is intended to include any OWC signal without limitation to a type of device used to generate the signal.

As shown in example 600, an MRR architecture may include a modulator 605 and a reflective structure 610. The modulator 605 be configured to absorb an incoming signal 615 (e.g., blocking the incoming signal 615) or to allow the incoming signal 615 to pass through the modulator 605. For example, the modulator 605 may be configured to modulate the incoming signal 615 by alternating between absorbing the incoming signal 615 and allowing the incoming signal 615 to pass through the modulator 605 based at least in part on a signaling pattern desired to be provided back to the second wireless communication device.

Based at least in part on portions (e.g., at time resources) of the incoming signal 615 being passed through the modulator 605, the incoming signal 615 may interact with the reflective structure 610. In some examples, the reflective structure 610 may include two back surfaces that are perpendicular to each other and are configured to reflect the incoming signal 615. In this way, the incoming signal may be output as a reflected signal 620 that is in an opposite direction (e.g., rotated 180 degrees) from the incoming signal 615. In some examples, the back surfaces may include perpendicular reflective surfaces at a back end of a cavity of the reflective structure 610. In some examples, the reflective structure 610 may be a solid prism with back surfaces that reflect the incoming signal 615 based at least in part on internal reflection (e.g., based at least in part on an interface with a medium behind the reflective structure having a difference of refractive indices that causes internal reflection within the reflective structure 610).

In some examples, the modulator 605 may receive an input of signaling for reflection 625. The signaling for reflection may include a waveform that indicates data and/or control information for providing to the second wireless communication device.

In some examples, the modulator 605 may apply the signaling for reflection 625 to the incoming signal 615 based at least in part on alternating between absorbing and passing through the incoming signal 615 and/or the reflected signal 620 with durations and a pattern that corresponds to the signaling for reflection 625. In this way, the MRR architecture may output a reflected and modulated signal 630 that carries data and/or control information based at least in part on application of modulation to the incoming signal 615 and/or the reflected signal 620.

As further shown in example 600, an angle of arrival (AoA) 635 of the incoming signal 615 may be approximately equal to an angle of departure (AoD) 640 of the reflected and modulated signal 630. In this way, the MRR architecture may provide the reflected and modulated signal 630 to the second wireless communication device without first performing beam management.

As shown in example 645, an MRR structure 650 may include a lens 655 and a modulator 660. The lens 655 may include a convex lens that focuses an incoming signal 665 on the modulator 660 (e.g., at a distance that is approximately equal to a focal length of the lens 655). The modulator 660 may include a reflective surface. The modulator 660 may include a multiple-quantum-well (MQW) modulator or another type of modulator that is configured to receive the incoming signal 665, apply a signaling for reflection 670 to the incoming signal 665, and output a reflected and modulated signal 675.

As further shown in example 645, an AoA 680 of the incoming signal 665 may be approximately equal to an AoD 685 of the reflected and modulated signal 675. In this way, the MRR architecture may provide the reflected and modulated signal 675 to the second wireless communication device without first performing beam management.

Other examples of MRR structures may be used to modulate and reflect an incoming signal. For example, the lens 655 may be replaced with a concave mirror and/or one or more convex lenses to focus the incoming signal 665 on the modulator 660. Additionally, or alternatively, the modulator 605 may be positioned to modulate only an incoming signal or only a reflected signal (e.g., based at least in part on positioning on only part of a surface of the reflective structure 610 that is nearest to the second wireless communication device along a transmission path of the incoming signal 615).

Based at least in part on using an MRR structure for communications with the second wireless communication device, the first wireless communication device may reduce power consumption relative to generating a signal for transmission to the second wireless communication device. Additionally, or alternatively, the first wireless communication device and the second wireless communication device may conserve power, computing, network, and communication resources that may have otherwise been used to perform beam management procedures to identify a direction for uplink communications.

As indicated above, FIG. 6 is provided as an example. Other examples may differ from what is described with regard to FIG. 6.

Laser-based OWC may be used in wireless communication networks, such as 6G and/or future generation cellular networks, personal area networks (PANs), wide area networks (WANs), and/or local area networks (LANs), among other examples. For example, laser-based OWC may be used for indoor extended reality (XR) devices (e.g., goggles or other display) used for gaming, computer-aided design (CAD) or other architectural or structural visualization, holographic conferencing, and/or other XR applications.

Laser-based OWC may be used for short range, high throughput, low latency communications. As described herein, an MRR device is capable of modulating an incoming laser beam (e.g., with a high bandwidth) and reflecting it back at an opposite angle from which it arrived (e.g., rotated 180 degrees toward a transmitting device).

Introducing an MRR into XR communications may allow simpler, power efficient UE designs, where no laser is required at a UE (e.g., an XR device). Additionally, or alternatively, beam management on the UE may be simplified based at least in part on the beam being automatically reflected back along the angle of arrival (e.g., no need for a P3 beam management procedure). In some examples, an asymmetric link using MRR OWC may support small, wide field of view optics at the UE (e.g., the UE is able to receive an incoming signal with a wide aperture and still reflect back the signal toward a transmitting device).

However, a UE may be unable to use MRR to perform an access procedure as described in connection with FIG. 4 based at least in part on the MRR being configured to use a reflection of a transmission from the network node to transmit. For example, the UE may receive an SSB with random access configuration information (e.g., described in connection with reference number 405) and may be unable to generate a signal to transmit as a msg1 based at least in part on failing to receive a signal from the network node to reflect in a time resource allocated for the msg1 by the random access configuration information.

In some examples, an RF initial access procedure is based on initially searching for a periodic signal (e.g., an SSB), allowing the UE to scan over different reception beams and network node transmission beams to find a best beam pair. Once the UE successfully finds a beam pair for initial attachment, the UE processes data inside the periodic signal to determine when to transmit an additional signal (e.g., a RACH message, such as msg1) to the network node indicating a request for attachment. The UE may transmit the additional signal using a beam pair identified using the periodic signal. The UE may transmit the additional signal in specific resources associated with RACH occasions (RO) as defined by the network node. In MRR based OWC, the UE will only modulate the signal transmitted by the gNB, therefore sending a RACH signal in the RO is not supported.

In some aspects described herein, a UE may receive a signal (e.g., an SSB) from a network node. The UE may reflect the signal with a modulation that indicates an identification of the UE. In this way, the network node may receive the reflected signal and may become aware of the presence of the UE. The reflected signal may initiate an initial attachment procedure (e.g., an access procedure and/or a random access procedure). In this way, the UE may conserve power resources that may have otherwise been used to generate and transmit a RACH message in response to receiving the SSB. Additionally, or alternatively, the UE may conserve computing and power resources that may have otherwise been used to activate an RF transmitter and/or an OWC transmitter to initiate the initial attachment procedure. Further, the UE and network node may conserve network resources that may have otherwise been used to support transmission of the RACH message in a separate time resource.

In some aspects, the UE may use an existing SSB structure (e.g., shown in FIG. 5) as a signal to reflect. The SSB structure includes 4 symbols. The UE may perform initial SSB detection on a first time resource (e.g., the PSS signal on a first symbol) and/or on a second time resource (e.g., the SSS signal on a third symbol). Based at least in part on detecting channel conditions that satisfy a threshold, the UE may modulate and reflect a third time resource of the SSB (e.g., a PBCH signal on the second symbol or the fourth symbol, with a master information block (MIB)) to indicate to the network node that initial access is requested.

In some aspects, the UE may need time to process the SSB to determine whether to transmit the indication to the network node that the initial access is request. In this case, the UE may use a first SSB to determine whether to transmit the indication and may use a subsequent SSB (e.g., a next SSB) to modulate and reflect the indication.

In some aspects, the UE may also identify information from the SSB. For example, the UE may decode the MIB from the SSB, which may indicate cell information to be used in subsequent initial access messages.

In some aspects, UE may use an MRR to constantly modulate arriving signals to indicate a request for initial access. In this case, the UE may modulate the arriving signals without processing the arriving signals to determine whether to transmit the indication for initial access. In some aspects, the UE may modulate any type of arriving signal (e.g., not limited to SSBs) to indicate a request for initial access. In some aspects, the UE may modulate the arriving signals with a repetitive pattern derived from an identification of the UE.

The network node may transmit the signal using multiple beams. For example, the network node may transmit the signal as a beam sweeping process (e.g., scanning for UEs) to provide an opportunity for the UE and/or other UEs to indicate a request for initial access. In some aspects, the SSB may reach the UE on an SSB beam. Based at least in part on the UE modulating and reflecting the signal to indicate the UE identification, the network node may receive a modulated reflection of the SSB and become aware of the existence of the UE on the SSB beam. The network node may then transmit information to the UE and/or transmit signals to the UE for modulation and reflection by the UE toward the network node for uplink signaling.

Figure 7:
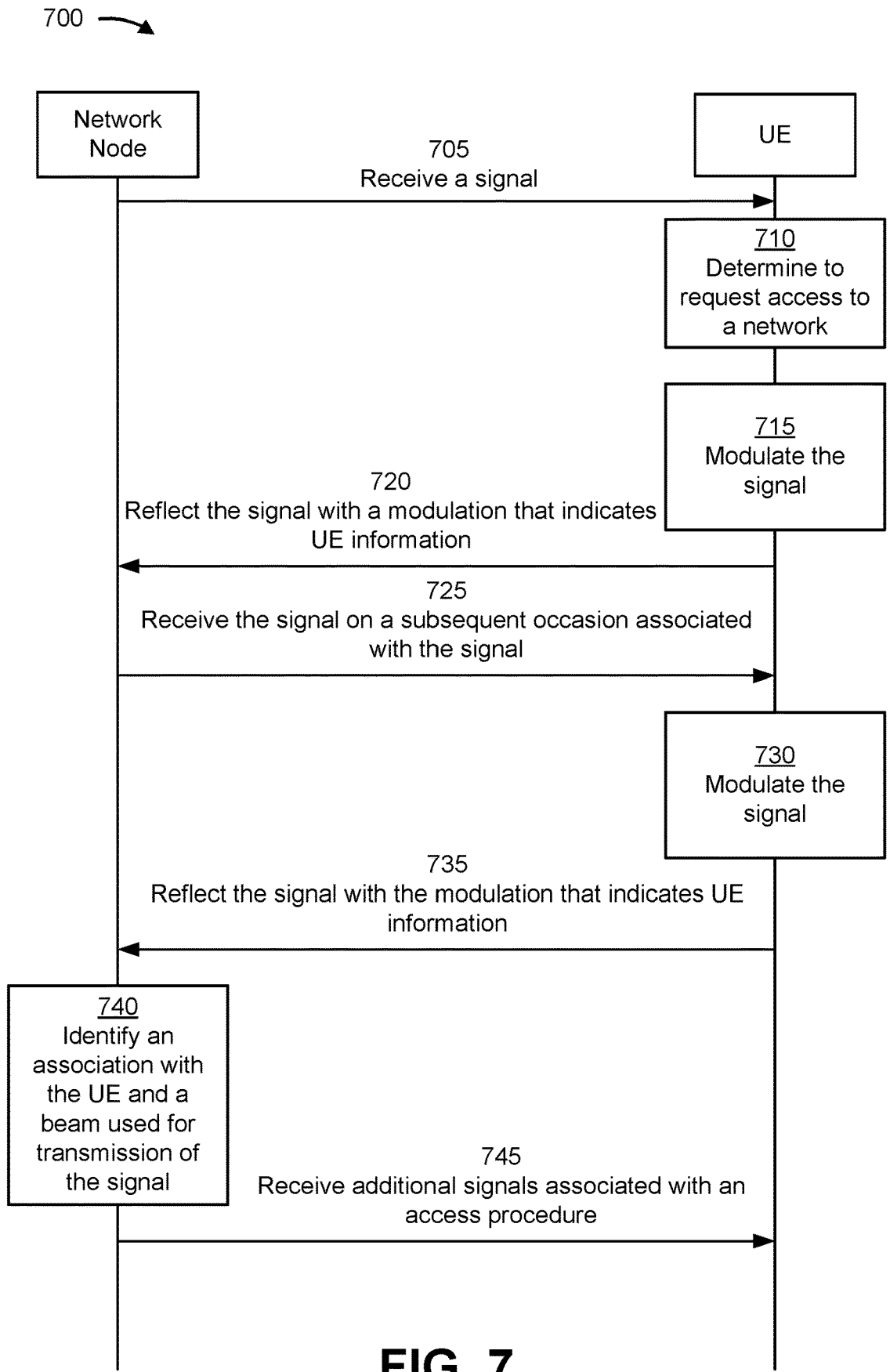
FIG. 7 is a diagram of an example associated with communication via a reflector, in accordance with the present disclosure.

FIG. 7 is a diagram of an example 700 associated with communication via a reflector, in accordance with the present disclosure. As shown in FIG. 7, a network node (e.g., network node 110, a CU, a DU, and/or an RU) may communicate with a UE (e.g., UE 120). In some aspects, the network node and the UE may be part of a wireless network (e.g., wireless network 100).

As shown by reference number 705, the UE may receive, and the network node may transmit, a signal. In some aspects, the signal may include a periodic signal. In some aspects, the signal may be configured to provide an occasion for an MRR-based communication from a UE. In some aspects, the signal may be associated with an initial access and/or may provide system information, such as a MIB. The signal may include an SSB. In some aspects, the signal may comprise an OWC signal.

In some aspects, the signal may occupy multiple time resources. For example, the signal my occupy multiple (e.g., 4) resources, as in the SSB described in connection with FIG. 5.

As shown by reference number 710, the UE may determine to request access to a network associated with the network node. For example, the UE may determine to request access to the network based at least in part on detection of the signal and/or based at least in part on one or more parameters of the signal. For example, the one or more parameters may include support for MRR-based communications, a signal strength of the signal as measured at the UE, and/or a configuration of the network as indicated in information of the signal (e.g., a MIB), among other examples. In this way, reception of the signal from the network node may include decoding an information block (e.g., a MIB) from the signal and/or identifying cell information associated with the network node.

As shown by reference number 715, the UE may modulate the signal to indicate UE information in a reflection of the signal. For example, the UE may modulate the signal using a modulator 605 or 660, as described in connection with FIG. 6. In some aspects, the information indicated in the reflection of the signal may include an identification of the UE, a request for initial access to the network, and/or information associated with a configuration of the UE for MRR-based communications.

In some aspects, the UE may be configured to modulate and/or reflect received signals (e.g., any received signals when attempting to access a network and/or when not connected to a network) without first determining to request access to the network based at least in part on the received signal. For example, the UE may modulate and reflect any received signal regardless of a signal strength of the received signal and/or parameters of a network associated with the received signal.

As shown by reference number 720, the UE may reflect the signal with a modulation that indicates UE information, as described in connection with reference number 715. In some aspects, the reflected signal may be modulated to initiate an initial attachment procedure, and/or an access procedure.

In some aspects, the UE may reflect the signal using an MRR component of the UE, such as MRR architectures described in connection with FIG. 6. In some aspects, the UE may reflect the signal before a modulation is applied. In some aspects, the UE may reflect the signal after the modulation is applied.

In some aspects where the SSB occupies multiple time resources (e.g., symbols), the UE may perform an initial detection (e.g., for determining to request access to the network) on a first time resource (e.g., a first symbol or a third symbol of an SSB, such as the PSS or the SSS). The UE may reflect the signal with the modulation on a second time resource of the signal (e.g., a second or fourth symbol of the SSB, such as the first PBCH or the second PBCH). The first time resource may be before the second resource so the UE may determine whether to reflect the signal using the first resource before reflecting the signal to indicate a request for access to the network.

In some aspects, operations described in connection with reference numbers 725 through 735 may be performed in alternative to the operations described in connection with reference number 715 and 720. For example, the UE may not support modulating and reflecting the signal during a same occasion as determining to request access to the network. This may be based at least in part on the UE having insufficient processing resources to make the determination and configure a modulator before the signal is complete.

As shown by reference number 725, the UE may receive the signal on a subsequent occasion associated with the signal. In some aspects, the signal may be periodic to provide opportunities for the UE or other UEs to receive information from the network node and/or to reflect a signal using MRR.

As shown by reference number 730, the UE may modulate the signal to indicate UE information in a reflection of the signal. For example, the UE may modulate the signal using a modulator 605 or 660, as described in connection with reference number 715. In some aspects, the information indicated in the reflection of the signal may include an identification of the UE, a request for initial access to the network, and/or information associated with a configuration of the UE for MRR-based communications.

As shown by reference number 735, the UE may reflect the signal with a modulation as described in connection with reference number 730. For example, the UE may reflect the signal using an MRR component of the UE, such as MRR architectures described in connection with FIG. 6. In some aspects, the UE may reflect the signal before a modulation is applied. In some aspects, the UE may reflect the signal after the modulation is applied.

In some aspects, the UE may reflect the signal with the modulation that indicates the identification of the UE based at least in part on reception of a prior signal from the network node. For example, the UE may reflect the signal at reference number 735 based at least in part on receiving the signal at reference number 705 and/or determining to request access to the network before receiving the signal at reference number 725.

As shown by reference number 740, the UE may identify an association with the UE and a beam used for transmission of the signal. For example, the UE may use a beam sweeping process (e.g., TDD transmission of the signal on different beams) to provide the signal to UEs on supported beams of the network node. Based at least in part on the UE using MRR to reflect the signal, the network node may receive the reflected signal during a same time resource (e.g., symbol) or set of time resources (e.g., accounting for propagation delay) as transmitting the signal. In this way, the network node may associate the UE with a beam without performing a beam management operation to select a beam.

As shown by reference number 745, the UE may receive, and the network node may transmit, additional signals associated with an access procedure. For example, the network node may transmit information to the UE associated with access to the network (e.g., a system information block). Additionally, or alternatively, network node may transmit signals to the UE for the UE to modulate for providing uplink information to the network node. In some aspects, the network node may transmit the additional signals with power parameters configured to support MRR-based communications (e.g., with power sufficient for reception at the network node after a round-trip propagation).

Based at least in part on the UE reflecting the signal (e.g., an SSB) to indicate an access request, the UE may conserve power resources that may have otherwise been used to generate and transmit a RACH message in response to receiving the SSB. Additionally, or alternatively, the UE may conserve computing and power resources that may have otherwise been used to activate an RF transmitter and/or an OWC transmitter to initiate the initial attachment procedure. Further, the UE and network node may conserve network resources that may have otherwise been used to support transmission of the RACH message in a separate time resource.

As indicated above, FIG. 7 is provided as an example. Other examples may differ from what is described with respect to FIG. 7.

Figure 8:
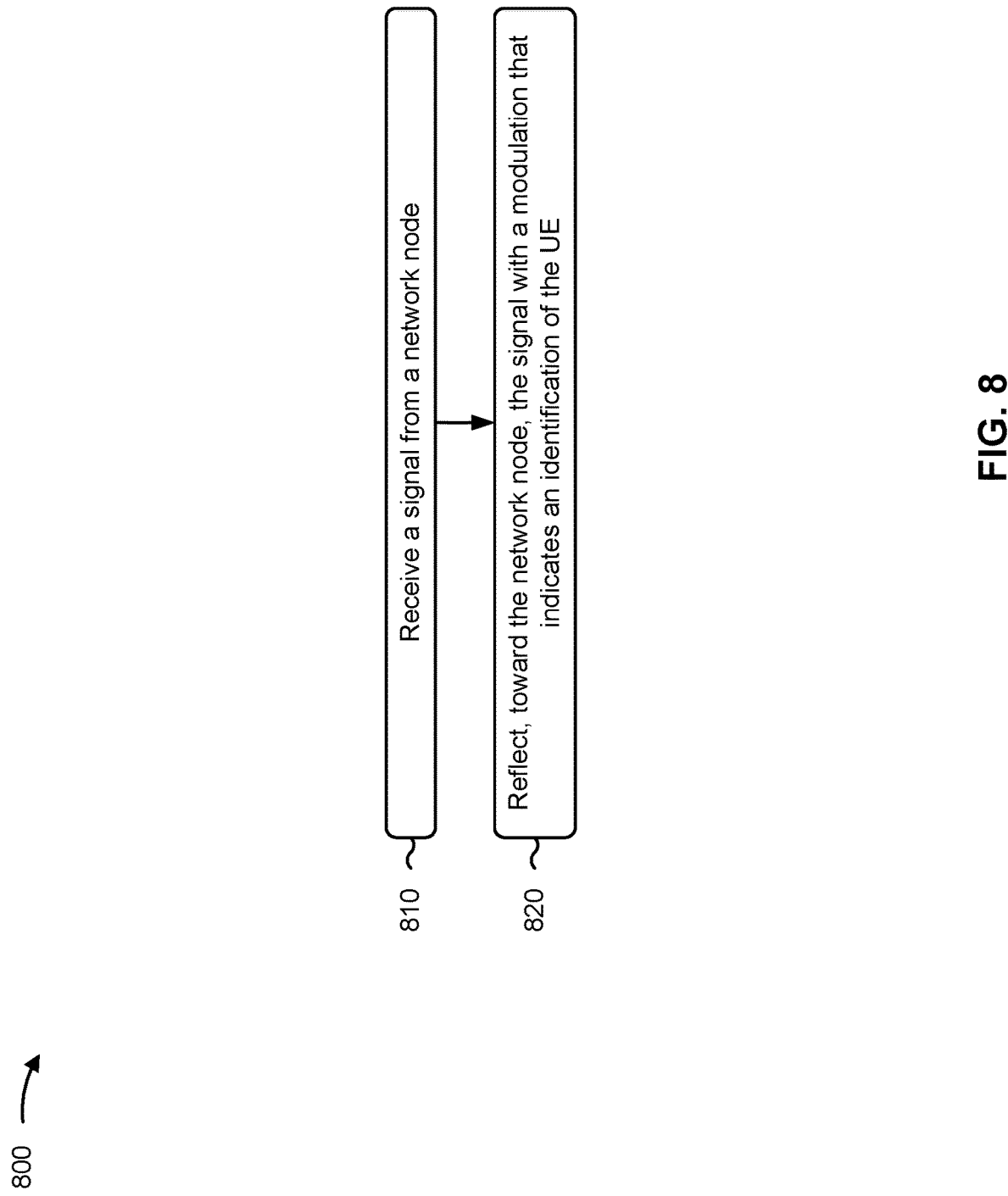
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with communication via a reflector.

As shown in FIG. 8, in some aspects, process 800 may include receiving a signal from a network node (block 810). For example, the UE (e.g., using reception component 1002 and/or communication manager 1008, depicted in FIG. 10) may receive a signal from a network node, as described above.

As further shown in FIG. 8, in some aspects, process 800 may include reflecting, toward the network node, the signal with a modulation that indicates an identification of the UE (block 820). For example, the UE (e.g., using communication manager 1008, depicted in FIG. 10) may reflect, toward the network node, the signal with a modulation that indicates an identification of the UE, as described above.

Process 800 may include additional aspects, such as any single aspect or any combination of aspects described below and/or in connection with one or more other processes described elsewhere herein.

In a first aspect, reflection of the signal with the modulation that indicates the identification of the UE initiates one or more of an initial attachment procedure, or an access procedure.

In a second aspect, alone or in combination with the first aspect, the signal from the network node comprises one or more of an SSB, or an optical wireless communication signal.

In a third aspect, alone or in combination with one or more of the first and second aspects, reflection of the signal with the modulation that indicates the identification of the UE comprises reflecting the signal using an MRR.

In a fourth aspect, alone or in combination with one or more of the first through third aspects, the signal occupies multiple time resources.

In a fifth aspect, alone or in combination with one or more of the first through fourth aspects, receiving the signal comprises performing an initial detection on a first time resource of the multiple time resources, and reflecting the signal with the modulation that indicates the identification of the UE comprises reflecting the signal on a second time resource of the multiple time resources.

In a sixth aspect, alone or in combination with one or more of the first through fifth aspects, the second time resource is after the first time resource.

In a seventh aspect, alone or in combination with one or more of the first through sixth aspects, reflecting the signal with the modulation that indicates the identification of the UE is based at least in part on reception of a prior signal from the network node.

In an eighth aspect, alone or in combination with one or more of the first through seventh aspects, the UE is configured to modulate received signals with a pattern associated with the identification of the UE.

In a ninth aspect, alone or in combination with one or more of the first through eighth aspects, reception of the signal from the network node comprises decoding an information block from the signal, and identifying cell information associated with the network node.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
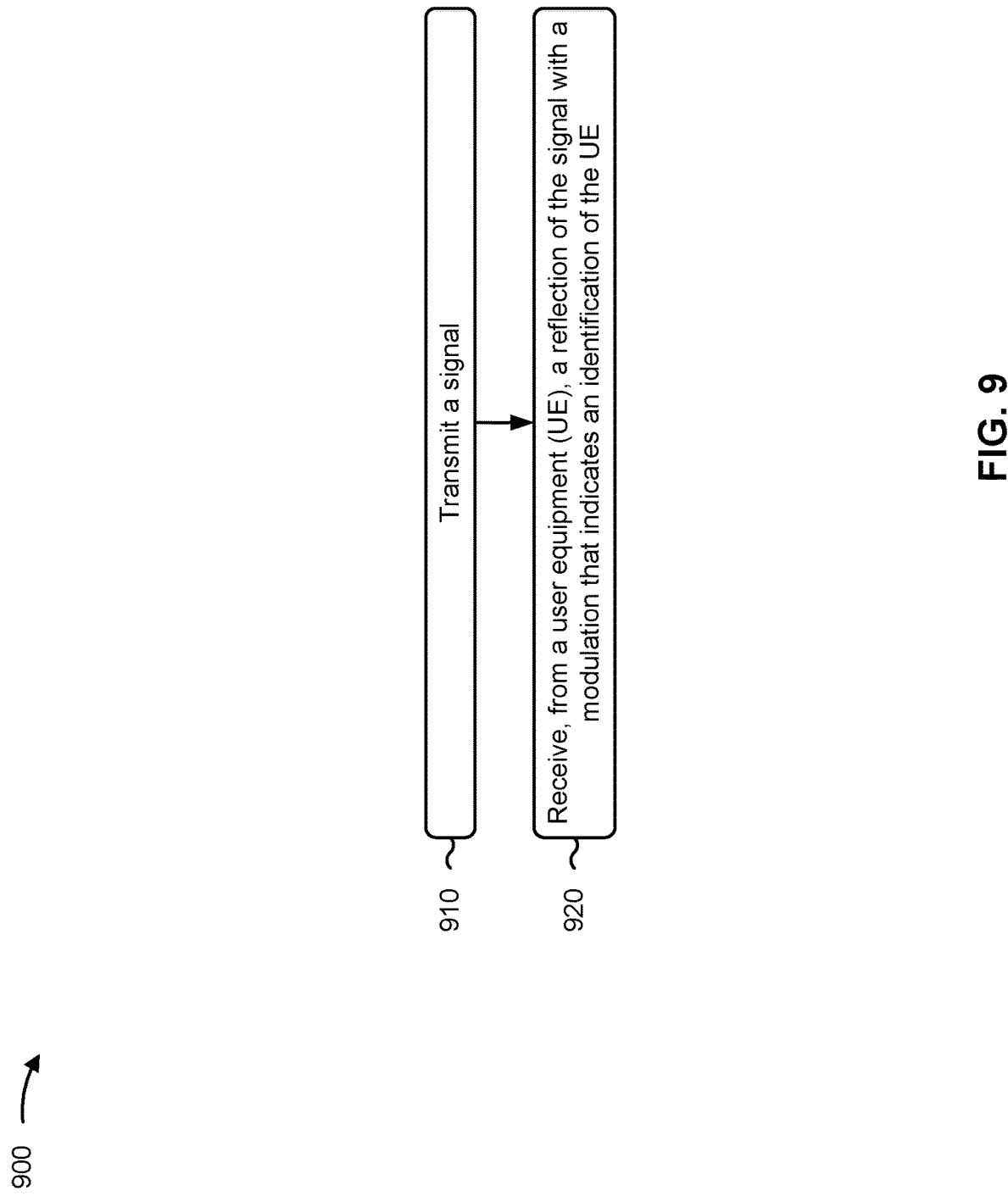
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with communication via a reflector.

As shown in FIG. 9, in some aspects, process 900 may include transmitting a signal (block 910). For example, the network node (e.g., using transmission component 1104 and/or communication manager 1108, depicted in FIG. 11) may transmit a signal, as described above.

As further shown in FIG. 9, in some aspects, process 900 may include receiving, from a UE, a reflection of the signal with a modulation that indicates an identification of the UE (block 920). For example, the network node (e.g., using reception component 1102 and/or communication manager 1108, depicted in FIG. 11) may receive, from a UE, a reflection of the signal with a modulation that indicates an identification of the UE, as described above.

Process 900 may include additional aspects, such as any single aspect or any combination of aspects described below and/or in connection with one or more other processes described elsewhere herein.

In a first aspect, the reflection of the signal with the modulation that indicates the identification of the UE initiates one or more of an initial attachment procedure, or an access procedure.

In a second aspect, alone or in combination with the first aspect, the signal comprises one or more of an SSB, or an optical wireless communication signal.

In a third aspect, alone or in combination with one or more of the first and second aspects, the signal occupies multiple time resources.

In a fourth aspect, alone or in combination with one or more of the first through third aspects, reception of the reflection of the signal with the modulation that indicates the identification of the UE comprises receiving the reflection of the signal on a proper subset of the multiple time resources.

In a fifth aspect, alone or in combination with one or more of the first through fourth aspects, the proper subset of the multiple time resources comprises a last resource of the multiple time resources, or the proper subset of the multiple time resources excludes a first resource of the multiple time resources.

In a sixth aspect, alone or in combination with one or more of the first through fifth aspects, transmission of the signal comprises one or more of transmitting the signal via multiple transmission beams, or transmitting the signal during a periodic resource for transmission of the signal.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
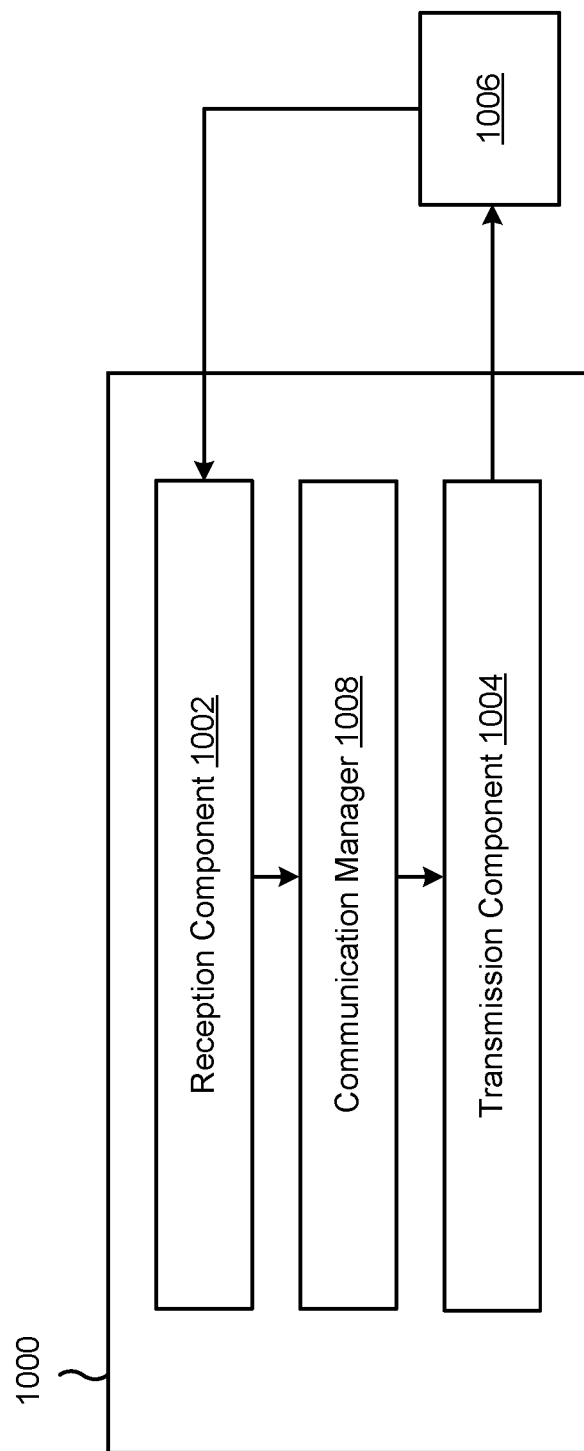
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1008, which may be in communication with one another (for example, via one or more buses and/or one or more other components). In some aspects, the communication manager 1008 is the communication manager 140 described in connection with FIG. 1. As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a signal from a network node. The communication manager 1008 may reflect, toward the network node, the signal with a modulation that indicates an identification of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
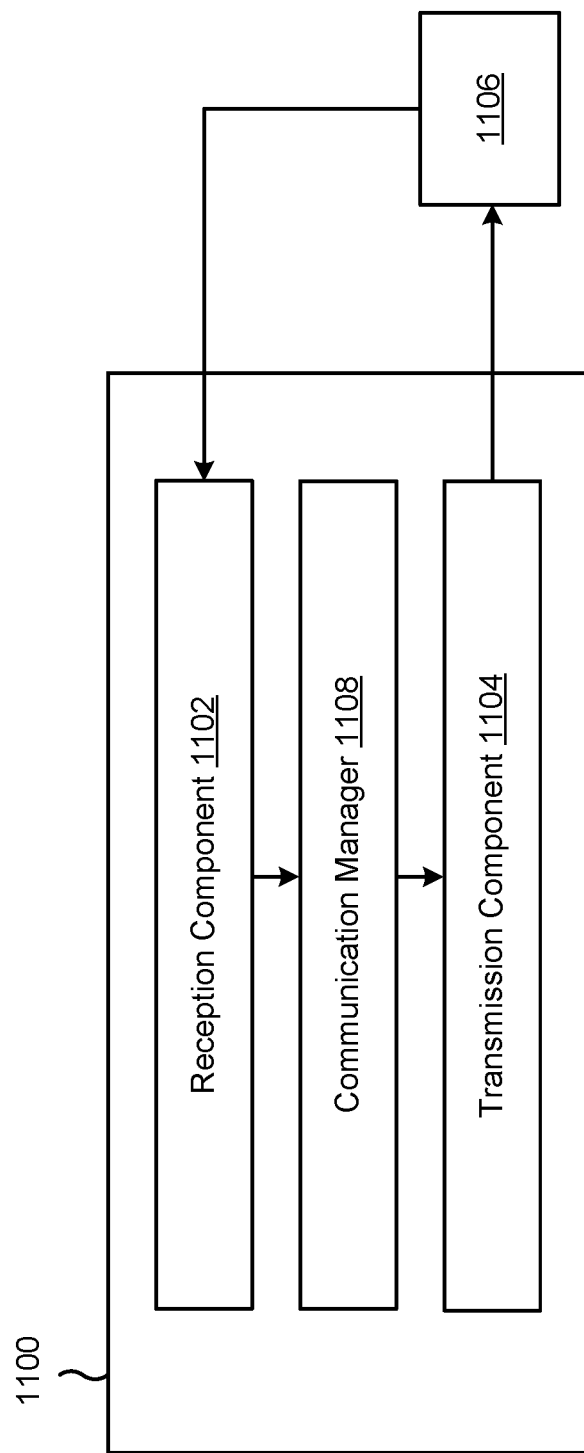
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1108, which may be in communication with one another (for example, via one or more buses and/or one or more other components). In some aspects, the communication manager 1108 is the communication manager 150 described in connection with FIG. 1. As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The transmission component 1104 may transmit a signal. The reception component 1102 may receive, from a UE, a reflection of the signal with a modulation that indicates an identification of the UE.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a signal from a network node; and reflecting, toward the network node, the signal with a modulation that indicates an identification of the UE.

Aspect 2: The method of Aspect 1, wherein reflection of the signal with the modulation that indicates the identification of the UE initiates one or more of: an initial attachment procedure, or an access procedure.

Aspect 3: The method of any of Aspects 1-2, wherein the signal from the network node comprises one or more of: a synchronization signal block (SSB), or an optical wireless communication signal.

Aspect 4: The method of any of Aspects 1-3, wherein reflection of the signal with the modulation that indicates the identification of the UE comprises: reflecting the signal using a modulated retro reflector (MRR).

Aspect 5: The method of any of Aspects 1-4, wherein the signal occupies multiple time resources.

Aspect 6: The method of Aspect 5, wherein receiving the signal comprises performing an initial detection on a first time resource of the multiple time resources, and wherein reflecting the signal with the modulation that indicates the identification of the UE comprises reflecting the signal on a second time resource of the multiple time resources.

Aspect 7: The method of Aspect 6, wherein the second time resource is after the first time resource.

Aspect 8: The method of any of Aspects 1-7, wherein reflecting the signal with the modulation that indicates the identification of the UE is based at least in part on reception of a prior signal from the network node.

Aspect 9: The method of any of Aspects 1-8, wherein the UE is configured to modulate received signals with a pattern associated with the identification of the UE.

Aspect 10: The method of any of Aspects 1-9, wherein reception of the signal from the network node comprises: decoding an information block from the signal; and identifying cell information associated with the network node.

Aspect 11: A method of wireless communication performed by a network node, comprising: transmitting a signal; and receiving, from a user equipment (UE), a reflection of the signal with a modulation that indicates an identification of the UE.

Aspect 12: The method of Aspect 11, wherein the reflection of the signal with the modulation that indicates the identification of the UE initiates one or more of: an initial attachment procedure, or an access procedure.

Aspect 13: The method of any of Aspects 11-12, wherein the signal comprises one or more of: a synchronization signal block (SSB), or an optical wireless communication signal.

Aspect 14: The method of any of Aspects 11-13, wherein the signal occupies multiple time resources.

Aspect 15: The method of Aspect 14, wherein reception of the reflection of the signal with the modulation that indicates the identification of the UE comprises: receiving the reflection of the signal on a proper subset of the multiple time resources.

Aspect 16: The method of Aspect 15, wherein the proper subset of the multiple time resources comprises a last resource of the multiple time resources, or wherein the proper subset of the multiple time resources excludes a first resource of the multiple time resources.

Aspect 17: The method of any of Aspects 11-16, wherein transmission of the signal comprises one or more of: transmitting the signal via multiple transmission beams; or transmitting the signal during a periodic resource for transmission of the signal.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive a signal from a network node, wherein the signal comprises a synchronization signal block (SSB), wherein the UE performs SSB detection on one or more of a primary synchronization signal (PSS) of the SSB or a secondary synchronization signal (SSS) of the SSB; and
        reflect, toward the network node and based at least in part on detection of one or more channel conditions that satisfy a threshold, a physical broadcast channel (PBCH) signal of the SSB with a modulation that indicates an identification of the UE.

2. The UE of claim 1, wherein reflection of the PBCH signal of the SSB with the modulation that indicates the identification of the UE initiates one or more of:
    an initial attachment procedure, or
    an access procedure.

3. The UE of claim 1, wherein the signal from the network node comprises
    an optical wireless communication signal.

4. The UE of claim 1, wherein to reflect the PBCH signal of the SSB with the modulation that indicates the identification of the UE, the one or more processors are configured to:
    reflect the PBCH signal of the SSB using a modulated retro reflector (MRR).

5. The UE of claim 1, wherein the signal occupies multiple time resources.

6. The UE of claim 5, wherein the PSS of the SSB occupies a first time resource of the multiple time resources, and wherein the SSS of the SSB occupies a second time resource of the multiple time resources.

7. The UE of claim 6, wherein the second time resource is after the first time resource.

8. The UE of claim 1, wherein reflecting the PBCH signal of the SSB with the modulation that indicates the identification of the UE is based at least in part on reception of a prior signal from the network node.

9. The UE of claim 1, wherein the UE is configured to modulate received signals with a pattern associated with the identification of the UE.

10. The UE of claim 1, wherein to receive the signal from the network node, the one or more processors are configured to:
    decode an information block from the signal; and
    identify cell information associated with the network node.

11. A network node for wireless communication, comprising:
    a memory; and
    one or more processors, coupled to the memory, configured to:
        transmit a signal, wherein the signal comprises a synchronization signal block (SSB); and
        receive, from a user equipment (UE) and based at least in part on one or more channel conditions satisfying a threshold, a reflection of a physical broadcast channel (PBCH) signal of the SSB with a modulation that indicates an identification of the UE.

12. The network node of claim 11, wherein the reflection of the PBCH signal of the SSB with the modulation that indicates the identification of the UE initiates one or more of:
    an initial attachment procedure, or
    an access procedure.

13. The network node of claim 11, wherein the signal comprises an optical wireless communication signal.

14. The network node of claim 11, wherein the signal occupies multiple time resources.

15. The network node of claim 14, wherein to receive the reflection of the PBCH signal of the SSB with the modulation that indicates the identification of the UE, the one or more processors are configured to:
receive the reflection of the PBCH signal of the SSB on a proper subset of the multiple time resources.

16. The network node of claim 15, wherein the proper subset of the multiple time resources excludes a resource of the multiple time resources.

17. The network node of claim 11, wherein to transmit the signal the one or more processors are configured to one or more of:
transmit the signal via multiple transmission beams; or
transmit the signal during a periodic resource for transmission of the signal.

18. A method of wireless communication performed by a user equipment (UE), comprising:
receiving a signal from a network node, wherein the signal comprises a synchronization signal block (SSB), wherein the UE performs SSB detection on one or more of a primary synchronization signal (PSS) of the SSB or a secondary synchronization signal (SSS) of the SSB; and
reflecting, toward the network node and based at least in part on detecting one or more channel conditions that satisfy a threshold, a physical broadcast channel (PBCH) signal of the SSB with a modulation that indicates an identification of the UE.

19. The method of claim 18, wherein reflecting the PBCH signal of the SSB with the modulation that indicates the identification of the UE initiates one or more of:
an initial attachment procedure, or
an access procedure.

20. The method of claim 18, wherein the signal from the network node comprises an optical wireless communication signal.

21. The method of claim 18, wherein reflecting the PBCH signal of the SSB with the modulation that indicates the identification of the UE comprises:
reflecting the PBCH signal of the SSB using a modulated retro reflector (MRR).

22. The method of claim 18, wherein the signal occupies multiple time resources.

23. The method of claim 22, wherein receiving the PSS of the SSB occupies a first time resource of the multiple time resources, and wherein the SSB occupies a second time resource of the multiple time resources.

24. The method of claim 18, wherein reflecting the PBCH signal of the SSB with the modulation that indicates the identification of the UE is based at least in part on reception of a prior signal from the network node.

25. The method of claim 18, wherein receiving the signal from the network node comprises:
decoding an information block from the signal; and
identifying cell information associated with the network node.

26. A method of wireless communication performed by a network node, comprising:
transmitting a signal, wherein the signal comprises a synchronization signal block (SSB); and
receiving, from a user equipment (UE) and based at least in part on one or more channel conditions satisfying a threshold, a reflection of a physical broadcast channel (PBCH) signal of the SSB with a modulation that indicates an identification of the UE.

27. The method of claim 26, wherein the reflection of the PBCH signal of the SSB with the modulation that indicates the identification of the UE initiates one or more of:
an initial attachment procedure, or
an access procedure.

28. The method of claim 26, wherein the signal comprises an optical wireless communication signal.

29. The method of claim 26, wherein the signal occupies multiple time resources.

30. The method of claim 26, wherein transmitting the signal comprises one or more of:
transmitting the signal via multiple transmission beams; or
transmitting the signal during a periodic resource for transmission of the signal.

* * * * *